(12) United States Patent
Neal et al.

(10) Patent No.: US 12,364,217 B2
(45) Date of Patent: Jul. 22, 2025

(54) VARIABLE RATE IRRIGATION USING MOTION SENSOR

(71) Applicant: NELSON IRRIGATION CORPORATION, Walla Walla, WA (US)

(72) Inventors: Meade M. Neal, Walla Walla, WA (US); Mark A. Bauman, College Place, WA (US); Craig B. Nelson, Walla Walla, WA (US); Travis A. Griggs, College Place, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 6 days.

(21) Appl. No.: 18/550,779

(22) PCT Filed: Mar. 15, 2022

(86) PCT No.: PCT/US2022/020332
§ 371 (c)(1),
(2) Date: Sep. 15, 2023

(87) PCT Pub. No.: WO2022/197671
PCT Pub. Date: Sep. 22, 2022

(65) Prior Publication Data
US 2024/0081202 A1 Mar. 14, 2024

Related U.S. Application Data

(60) Provisional application No. 63/163,427, filed on Mar. 19, 2021.

(51) Int. Cl.
*A01G 25/16* (2006.01)
*A01G 25/09* (2006.01)

(52) U.S. Cl.
CPC .......... *A01G 25/16* (2013.01); *A01G 25/092* (2013.01); *A01G 25/165* (2013.01)

(58) Field of Classification Search
USPC ........................................................ 700/284
See application file for complete search history.

(56) References Cited

U.S. PATENT DOCUMENTS 5,927,603 A * 7/1999 McNabb .............. A01G 25/167
239/69
9,185,856 B1 11/2015 Barcatta
(Continued)

FOREIGN PATENT DOCUMENTS

RU 2 664 932 C1 * 8/2018

OTHER PUBLICATIONS

KR-101249773-B1 (Year: 2013).*
(Continued)

*Primary Examiner* — Hien D Khuu
(74) *Attorney, Agent, or Firm* — NIXON & VANDERHYE P.C.

(57) ABSTRACT

A sprinkler controller is cooperable with a sprinkler assembly that receives fluid input from a pipe span. The sprinkler controller includes a microcontroller circuit, a motion sensor coupled with the microcontroller circuit, and a valve assembly including a modulator coupled with the microcontroller circuit and a valve coupled with the sprinkler assembly. The valve meters or controls an amount of fluid output from the sprinkler assembly, and the microcontroller circuit is programmed to control the valve assembly based on input from the motion sensor. With a series of sprinkler controllers in a center pivot irrigation system, the drop numbers for each of the sprinkler assemblies can be determined based on input from the motion sensors.

19 Claims, 4 Drawing Sheets

(56) References Cited

U.S. PATENT DOCUMENTS

| | | | |
|---|---|---|---|
| 10,631,476 B2 | 4/2020 | Bauman et al. | |
| 12,128,180 B2* | 10/2024 | Bowen | A24F 40/50 |
| 2013/0211717 A1* | 8/2013 | Abts | A01G 25/092 |
| | | | 701/485 |
| 2015/0060580 A1* | 3/2015 | Welch | A01G 25/092 |
| | | | 239/729 |
| 2016/0100533 A1* | 4/2016 | Bauman | G05B 15/02 |
| | | | 700/284 |
| 2016/0202679 A1 | 7/2016 | Bermudez Rodriguez et al. | |
| 2017/0049061 A1* | 2/2017 | Khabbaz | A01G 25/162 |
| 2018/0042188 A1* | 2/2018 | Khabbaz | H04B 11/00 |
| 2018/0054982 A1* | 3/2018 | Whalley | A01G 25/16 |
| 2019/0141918 A1* | 5/2019 | Bauman | G05B 15/02 |
| | | | 700/284 |
| 2021/0076579 A1* | 3/2021 | Thatcher | A01G 25/16 |

OTHER PUBLICATIONS

International Search Report dated Aug. 30, 2022 issued in PCT International Patent Application No. PCT/US2022/020332, 5 pp.
International Preliminary Report on Patentability dated Aug. 16, 2023 issued in PCT International Patent Application No. PCT/US2022/020332, 23 pp.

* cited by examiner

VARIABLE RATE IRRIGATION USING MOTION SENSOR

CROSS-REFERENCES TO RELATED APPLICATIONS

This application is the U.S. national phase of International Application No. PCT/US2022/020332 filed Mar. 15, 2022 which designated the U.S. and claims priority to U.S. Provisional Patent Application No. 63/163,427 filed Mar. 19, 2021, the entire contents of each of which are hereby incorporated by reference.

STATEMENT REGARDING FEDERALLY SPONSORED RESEARCH OR DEVELOPMENT (Not Applicable)

BACKGROUND

The invention relates to a center pivot irrigation system and, more particularly, to a sprinkler controller and a center pivot irrigation system including a plurality of sprinkler controllers that utilize motion sensors to determine a position along a pipe span.

Common irrigation machines most often include an overhead sprinkler irrigation system consisting of several segments of pipe joined together and supported by trusses, mounted on wheeled towers with sprinklers positioned along its length. These center pivot systems move in a circular pattern and are coupled with an outside source of water or some other solution.

An important function of an irrigation system is to apply irrigation to a given location. Ideally, irrigation systems irrigate in exact amounts to precise locations. In reality, however, there are many factors that complicate the precise delivery of irrigation. In response to these many factors, variable rate irrigation (VRI) systems allow for the continual adjustment of sprinkler rates and other sprinkler settings.

To be optimized, variable rate sprinkler systems require a continual flow of location information. These systems work best when they are able to obtain and dynamically update the exact location of each individual sprinkler as they are transported though a field. Presently, these types of calculations are difficult to obtain for a number of reasons.

If cost and complexity were not issues, the ideal configuration for VRI would be to have independent control of every sprinkler. For a center pivot, that means there could be 200 or so independently controlled sprinklers.

In an existing system, each sprinkler is equipped with a controller that is able to ascertain its location using a GPS receiver. In addition, each sprinkler is able to receive a set of irrigation instructions that are tagged with location information. Each sprinkler controller then uses its GPS to determine its location and then irrigate according to its location-specific instructions. This makes it possible to install each of the controllers without individually assigning and keeping track of their drop number (for example with 1 being closest to the center, with n+1 to the end of the pipe span). See, for example, U.S. Pat. No. 10,631,476, owned by Nelson Irrigation Corporation, the contents of which are hereby incorporated by reference. This reduces the complexity to the end-user by making each sprinkler controller interchangeable and not bound to the drop number, thereby making initial installation and replacement easier and less prone to error. The downside of this concept is cost as adding a GPS receiver to every sprinkler controller is expensive.

SUMMARY

It would be desirable to provide a system that is able to quickly, efficiently and inexpensively calculate the location of irrigation sprinklers during irrigation operations.

The system of the described embodiments uses a unique characteristic of center pivots to eliminate the need to assign drop numbers to the sprinkler controllers in a manner that is more cost effective than individual GPS receivers. Each sprinkler controller circuit includes an accelerometer or inertial measurement unit to measure and analyze its own motion over a period of time. In a center pivot irrigation system that has a pivot center, sprinklers each travel in a series of concentrically circular paths about the pivot point. As such, a sprinkler close to the pivot point will travel a shorter distance over time than a sprinkler that is located at a further distance from the pivot point. It follows then that a sprinkler closer to the pivot point will experience a lesser degree of acceleration and velocity than a sprinkler that is located farther from the pivot point.

Accelerometers and/or devices for inertial measurement can be used to measure relative travel characteristics of the sprinkler assemblies and are considerably less expensive than GPS receivers.

In an exemplary embodiment, a sprinkler controller is cooperable with a sprinkler assembly that receives fluid input from a pipe span. The sprinkler controller includes a microcontroller circuit, a motion sensor coupled with the microcontroller circuit, and a valve assembly with a modulator coupled with the microcontroller circuit and a valve coupled with the sprinkler assembly. The valve meters or controls an amount of fluid output from the sprinkler assembly. The microcontroller circuit is programmed to control the valve assembly based on input from the motion sensor.

The motion sensor may be an accelerometer and/or an inertial measurement device and/or a global positioning system (GPS) device. In any or all of the described embodiments, the input from the motion sensor may include motion history.

In another exemplary embodiment, a center pivot irrigation system includes a pivot center, a pipe span pivotally connected to the pivot center, a plurality of sprinkler assemblies connected along the pipe span, at least one movable pivot tower spaced from the pivot center and supporting the pipe span, and a sprinkler controller cooperable with each of the sprinkler assemblies.

The system may further include a primary controller circuit communicating with each of the sprinkler controllers that receives motion sensor data from each of the microcontroller circuits. The primary controller may be programmed to process the motion sensor data and assign a drop number to each microcontroller circuit based on a mathematical model. The sprinkler controllers may each be programmed to share the input from the motion sensor with a neighboring sprinkler controller, and the sprinkler controllers may be programmed to compare the shared input with its own measured motion input to determine if the neighboring sprinkler controller is closer to or farther from the pivot center. In this context, the system may also include a primary controller circuit communicating with each of the sprinkler controllers that is programmed to determine a drop number for each of the sprinkler assemblies based on the shared input comparison by the sprinkler controllers.

In yet another exemplary embodiment, a sprinkler controller set includes a plurality of sprinkler controllers cooperable with a respective plurality of sprinkler assemblies that receive fluid input from a pipe span. The sprinkler controller contains a primary controller circuit communicating with each of the sprinkler controllers. Each of the sprinkler controllers in the sprinkler controller set includes a microcontroller circuit, and a motion sensor coupled with the microcontroller circuit. The primary controller circuit is configured to receive motion sensor data from each of the microcontroller circuits, and the primary controller is programmed to process the motion sensor data and assign a drop number to each microcontroller circuit based on a mathematical model.

The motion sensor may include an accelerometer. The primary controller circuit may be configured to compare a measured acceleration from each of the sprinkler controllers via the accelerometer such that the drop number for each of the microcontroller circuits can be assigned. The primary controller circuit may be configured to calculate a velocity of each of the sprinkler assemblies by integrating measured acceleration values from each of the sprinkler controllers, where relative velocities of each of the sprinkler assemblies yields the drop number for each of the microcontroller circuits.

Each of the sprinkler controllers may include a reed switch to enable a data reset.

In still another exemplary embodiment, each sprinkler controller in a sprinkler controller set includes the microcontroller circuit and a motion sensor coupled with the microcontroller circuit. The sprinkler controllers are each programmed to share input from the motion sensor with a neighboring sprinkler controller, and the sprinkler controllers are programmed to compare the shared input with its own measured motion input to determine if the neighboring sprinkler controller is closer to or farther from a pivot center.

In some embodiments, each of the sprinkler controllers may further include a valve assembly including a modulator coupled with the microcontroller circuit and a valve coupled with the sprinkler assembly, where the valve meters or controls an amount of fluid output from the sprinkler assembly, and the microcontroller circuit may be programmed to control the valve assembly based on input from the motion sensor. Each of the sprinkler controllers may further include an upstream pressure sensor and a downstream pressure sensor in fluid communication with the valve and coupled with the microcontroller circuit, with the upstream pressure sensor measuring an upstream pressure value of the fluid input to the valve, and with the downstream pressure sensor measuring a downstream pressure of the fluid exiting the valve, where the microcontroller circuit may be configured to determine characteristics of fluid flow based on output from the upstream and downstream pressure sensors. Each of the microcontroller circuits may be configured to measure its motion and calculate appropriate parameters to operate the valve so that an amount of the fluid applied may be a function of the measured motion, whereby the sprinkler assemblies that may be located closer to a pivot center will apply less water than the sprinkler assemblies that may be located farther from the pivot center.

The motion sensor and the microcontroller circuit may be configured to determine a direction of travel, and the microcontroller circuit may be programmed to control the valve assembly based on the direction of travel. The microcontroller circuit may be programmed to open the valve assembly to direct the fluid output only in a direction that may be opposite to the direction of travel.

BRIEF DESCRIPTION OF THE DRAWINGS

These and other aspects and advantages will be described in detail with reference to the accompanying drawings, in which.

DETAILED DESCRIPTION

Figure 1:
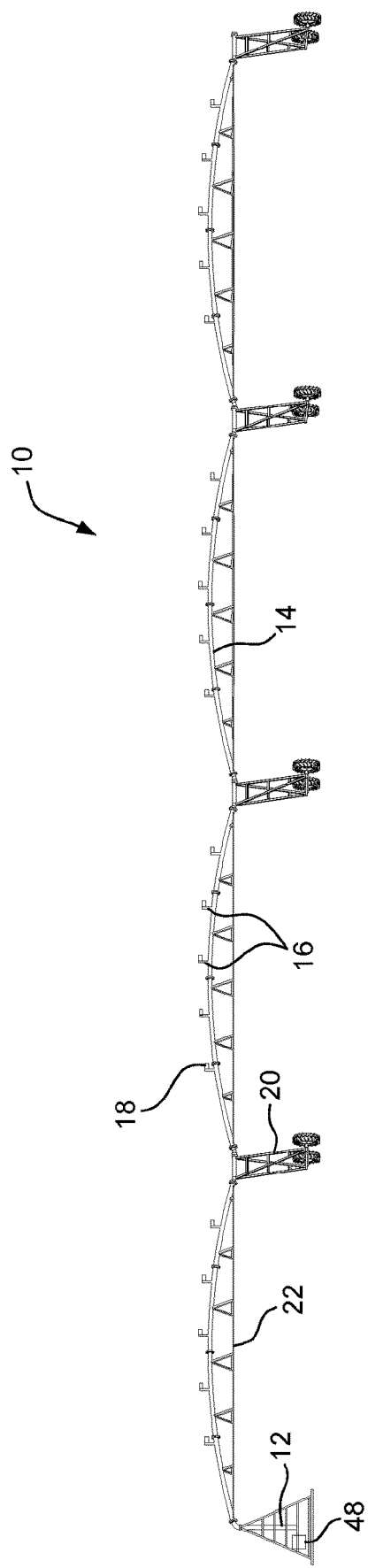
FIGS. 1 and 2 show a center pivot irrigation system.
Figure 2:
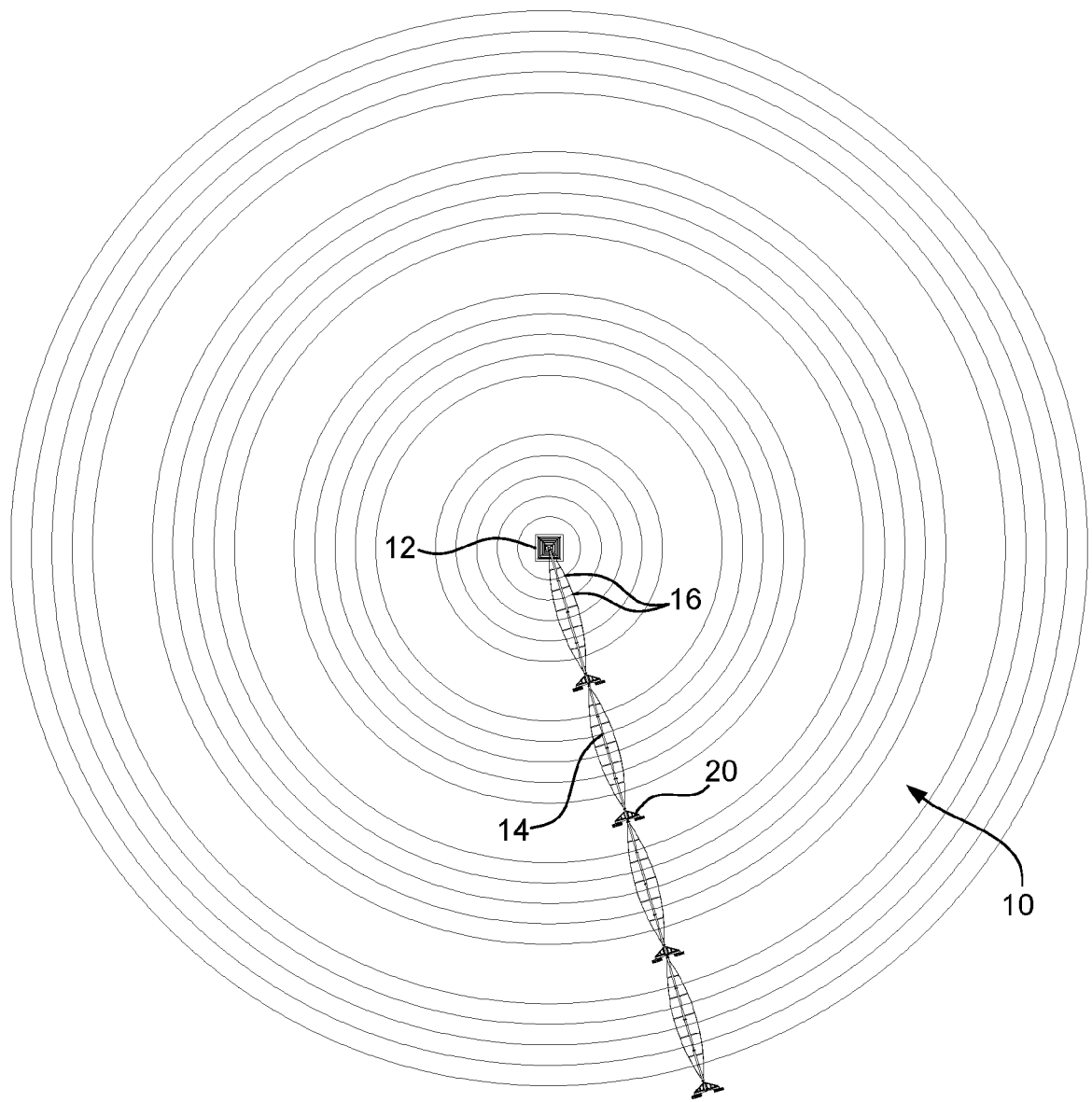

FIGS. 1 and 2 show an exemplary center pivot irrigation system 10. The system 10 includes a pivot center 12, a pipe span 14 pivotally connected to the pivot center 12, and a plurality of outlets/sprinkler assemblies 16 connected along the pipe span 14. The sprinkler assemblies 16 typically include sprinklers that may be connected directly to the pipe span or may alternatively be connected to the pipe span via a gooseneck pipe, a drop hose, or the like.

A sprinkler controller 18 is associated with each of the sprinkler assemblies 16. As discussed in more detail below, the sprinkler controllers 18 serve to control a valve in the sprinkler assembly 16 to meter the amount of fluid being distributed by the sprinkler assembly.

The center pivot irrigation system 10 also includes at least one movable pivot tower 20 that provides support and propulsion for the pipe span 14. The pipe span 14 is also typically supported via truss rods 22.

Figure 3:
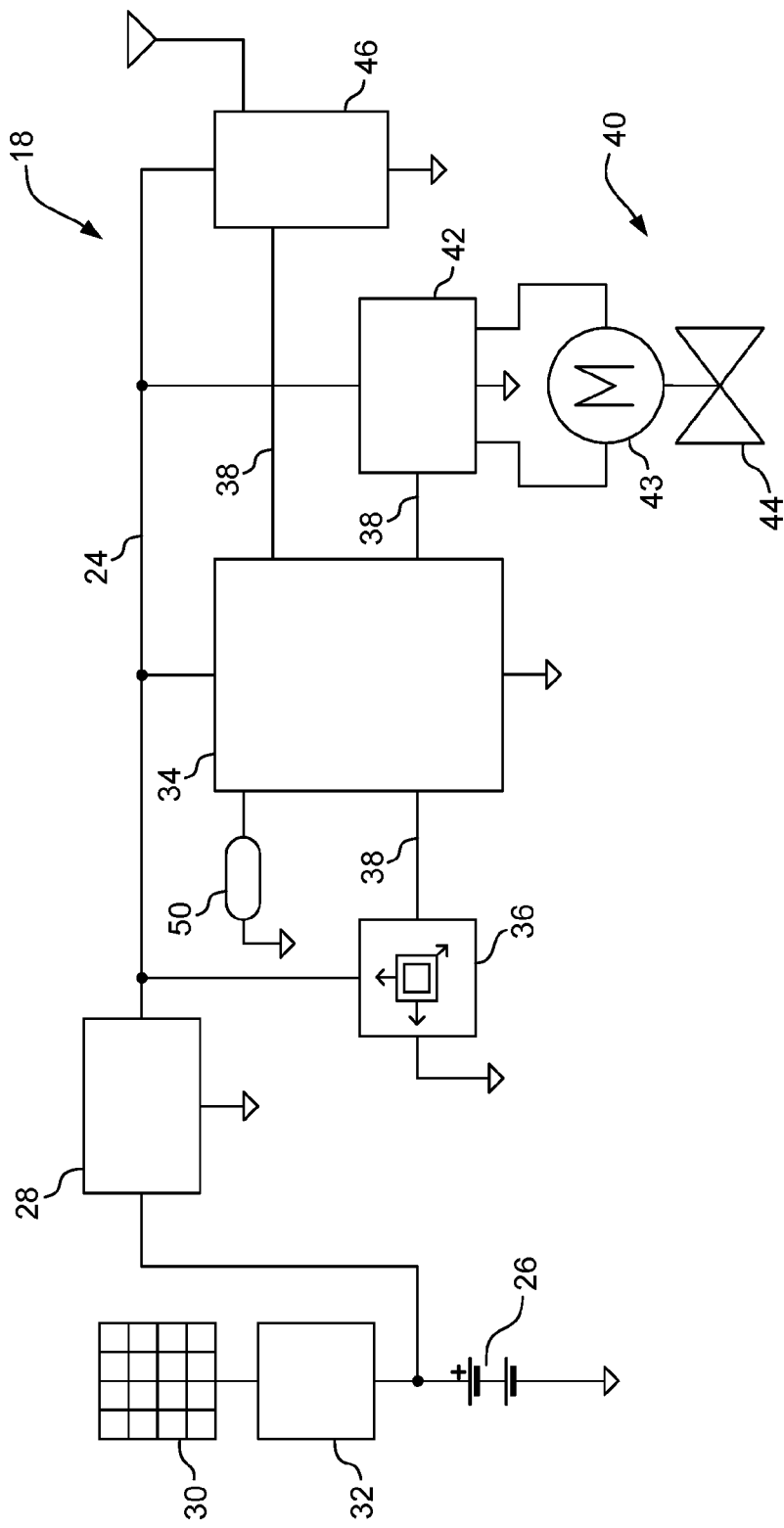
FIG. 3 is a schematic block diagram of a sprinkler controller.

FIG. 3 is a schematic block diagram of the sprinkler controller 18. The sprinkler controller 18 includes a supply (Vcc) 24 sourced by a rechargeable battery 26 through a voltage regulator 28 via a solar panel 30 and a battery charger 32. A microcontroller circuit 34 receives data from a motion sensor 36 via a data bus 38. The motion sensor 36 may be an accelerometer or an inertial measurement unit or the like. A valve assembly 40 includes a modulator 42 coupled with the microcontroller circuit 34 via the data bus 38 that drives an actuator 43 that controls a valve 44 that is coupled with the sprinkler assembly 16. The valve 44 serves to meter or control fluid output from the sprinkler assembly 16. The valve may be a hydraulic valve or an electric valve.

The sprinkler controller 18 may also include a wireless transceiver 46 for sending and receiving data to/from the microcontroller circuit 34. As discussed in more detail below, data from the microcontroller circuit 34 may be sent to a primary controller circuit 48 positioned remotely from the sprinkler controller 18 or to/from neighboring sprinkler controllers 18.

In a center pivot irrigation system, with reference to FIG. 2, the sprinkler assemblies 16 travel in a series of concentrically circular paths about the pivot center 12. As such, a sprinkler assembly 16 close to the pivot center 12 will travel a shorter distance over time than a sprinkler assembly 16 that is located farther from the pivot center 12. Thus, a sprinkler assembly 16 closer to the pivot center 12 will experience a lesser degree of acceleration and velocity than a sprinkler assembly 16 that is located farther from the pivot center 12.

The motion sensor 36 associated with each sprinkler controller 18 measures motion characteristics of its corresponding sprinkler assembly 16, which subsequently can be compared with motion characteristics of the other sprinkler assemblies 16 to thereby determine a relative location or drop number for each sprinkler assembly 16. The "drop number" refers to the position of each sprinkler relative to the pivot center 12, with drop number 1 being the first sprinkler assembly closest to the pivot center 12, which number is incremented by one for each sprinkler assembly to the end of the pipe span 14.

Using an accelerometer as an exemplary motion sensor 36, as the pivot system 10 starts to move, at each sprinkler controller 18 location, acceleration can be measured and output to the microcontroller circuit 34. The accelerometer has three axes: x, y and z. The acceleration measured on each axis can be combined to find the magnitude of the acceleration vector:

$$A=(Ax^2+Ay^2+Az^2)^{1/2}$$

Because of the rotational mechanics of the pivot system 10, each outlet/sprinkler assembly 16 experiences tangential acceleration At and centripetal acceleration Ac.

At=ra where r is the radius to the sprinkler assembly from the rotation point of the pivot, and a is the angular acceleration in rad/sec.

Ac=V^2/r where V is the tangential velocity.

V=wr where w is angular rotation speed.

w=at where t is time.

The square root of the sum of the squares of Ac and At is equal to A, which is the acceleration magnitude measured by the accelerometer. Since both At and Ac increase in magnitude with an increase in pivot rotation speed and an increase in radius, the acceleration at each outlet will increase as well. Therefore, by comparing the measured acceleration from each sprinkler controller 18, the positions can be determined from lowest to highest acceleration from the pivot center 12 to the end of the pipe span 14. Velocity can also be determined from acceleration using differential equations by integrating the acceleration values. Comparing relative velocities of each of the sprinkler assemblies 16 will yield the drop number.

In some embodiments, each sprinkler controller 18 characterizes its own motion and sends this information to the primary controller circuit 48, whose task is to collect this information from all the sprinkler controllers 18. The primary controller circuit 48 evaluates this information and then assigns a drop number to each individual sprinkler controller 18 based on a mathematical model that describes the physics of the situation (i.e., average sprinkler motion is a linear product of a constant (2*p) multiplied by the distance of the sprinkler assembly to the pivot center 12).

In some embodiments, each sprinkler controller 18 characterizes its own motion and periodically shares this motion information with a neighboring sprinkler controller 18. The neighboring sprinkler controller 18 compares this received motion information with its own measured motion to determine if the shared motion information indicates whether the neighboring controller 18 is closer to or farther from the pivot center 12 than itself. The primary controller circuit 48 may be programmed to determine a drop number for each of the sprinkler assemblies 16 based on the shared input comparison by the sprinkler controllers 18.

Alternatively, each sprinkler controller 18 may be programmed to self-order according to its own distance from the pivot center 12 and thereby provide a self-assigned drop number. In this configuration, the system 10 may not require the primary controller circuit 48. The sprinkler controllers 18 may be programmed with a distributed sorting algorithm to have the drops self-organize their order, the computation being done on the unit itself via the respective sprinkler controllers 18. Each sprinkler controller 18 communicates with its peers nearby, compares its velocity values, and the sprinkler controllers 18 sort themselves appropriately. For robustness, the sprinkler controllers 18 may then communicate the results with each other using a consensus criteria to resolve discrepancies and merge additional data from farther along the line. This configuration reduces the cost of the system by eliminating the primary controller circuit 48 and reduces a potential single point of failure at the same time. The configuration according to this embodiment would make the "network" formed by the sprinkler controllers 18 a quasi-mesh, with particular properties defined by the linear arrangement.

A gateway node (e.g., cell modem) to communicate with other entities (such as the internet) may exist at the tower location still, but not be required for the otherwise self-encapsulated parallel/distributed computation of the sprinkler controllers 18.

In some embodiments, the sprinkler controllers 18 may be provided with a reed switch 50 to enable a data reset. Once a sprinkler assembly drop number is determined, it will remain in the same position until the sprinkler is replaced or repositioned. The reed switch 50 will enable the sprinkler controllers 18 to recheck acceleration and redetermine its drop number.

Figure 4:
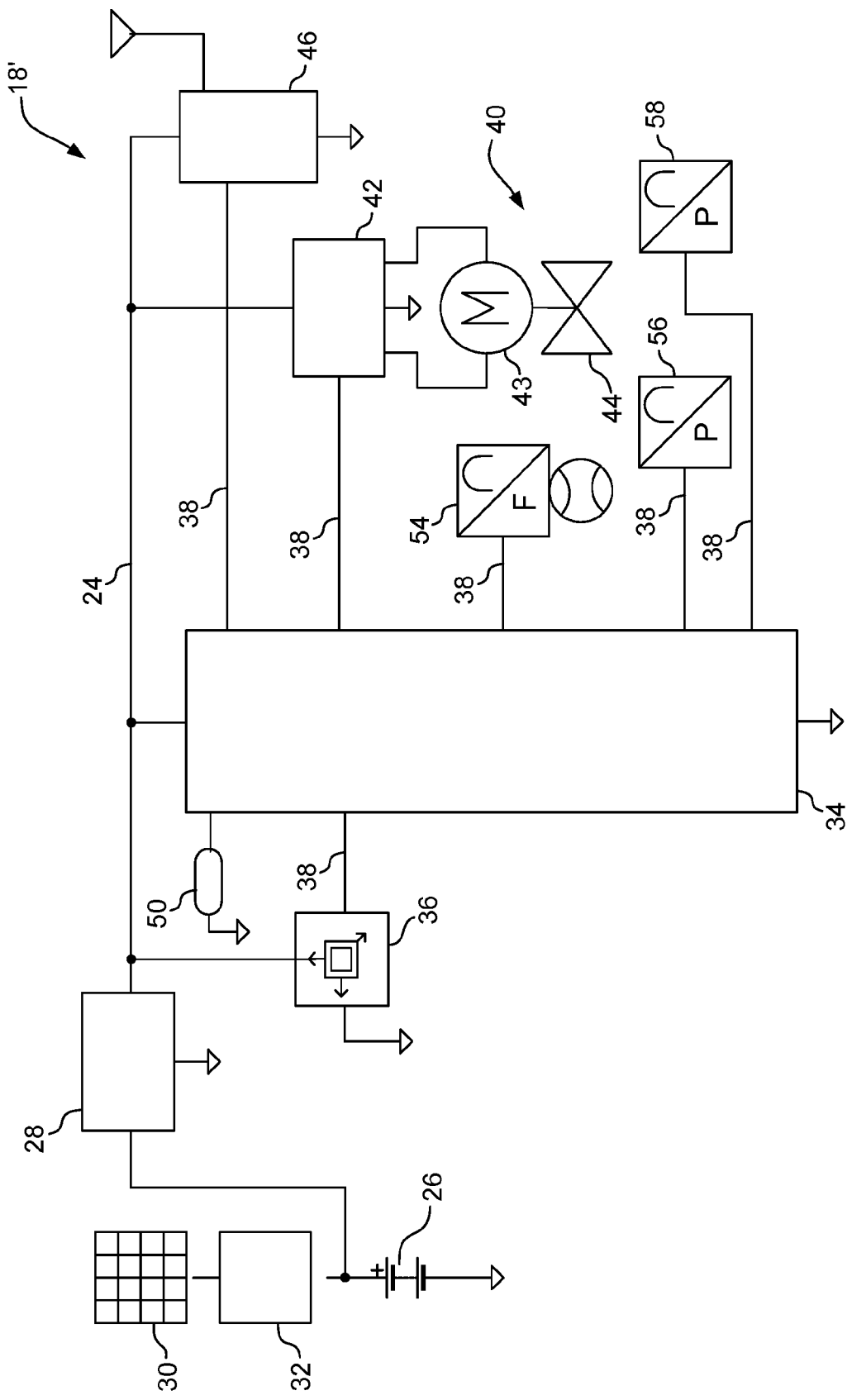
FIG. 4 is a schematic block diagram of a sprinkler controller with fluid feedback.

FIG. 4 is a schematic block diagram of a sprinkler controller 18' with fluid feedback. The sprinkler controller 18' is similar in configuration to the FIG. 3 controller 18 but provides for the addition of feedback sensors that can be used to inform the microcontroller circuit 34. For example, a flow sensor 54 is provided to transfer data to the microcontroller circuit 34 via the bus 38. The flow sensor 54 is connected in fluid relation to the valve 44 so that it is able to measure the amount of fluid flowing therethrough. The flow sensor 54 can be realized as a self-heated thermistor immersed in the fluid path as is known in the art.

Alternatively, an upstream pressure sensor 56 and downstream pressure sensor 58 may be provided to transfer data to the microcontroller circuit 34 via the bus 38. Each of these sensors 56, 58 is located in fluid communication with the valve 44, so that the upstream sensor 56 is able to measure a value of the pressure of the fluid entering the valve 44, and the downstream sensor 58 is able to measure a value of the pressure as the fluid exits the valve 44. The microcontroller circuit 34 is configured to ascertain from the data provided by these sensors 56, 58 characteristics of the fluid flow.

In some embodiments, and when uniform water distribution is desired, an equal amount of water is applied over an irrigated area per unit time. A sprinkler assembly 16 is configured via the microcontroller circuit 34 to measure its motion and calculate appropriate parameters to drive the modulator 42 and actuator 43 to operate the valve 44 so that the amount of water applied is a function of the measured motion. In this situation, the sprinkler assemblies 16 that are located closer to the pivot center 12 will apply less water than the sprinkler assemblies 16 that are located farther from the pivot center 12 so that there is a uniform water distribution. In this context, each sprinkler assembly 16 could be manufactured in an identical manner, and the amount of water applied would be varied based on its own individual motion history.

In some embodiments, it may be desirable to direct water according to a direction of motion traveled by the sprinkler controller 18. For example, some irrigation systems are configured for travel in both forward and reverse directions. In this situation, it is desirable to direct water in a manner that is opposite the direction of travel so that wheels supporting the irrigation machine travel on relatively dry ground.

In one such embodiment, the sprinkler controller 18 uses the motion sensor 36 and microcontroller circuit 34 to determine a direction of travel and then, based on that direction of travel, will drive the modulator 42 and actuator 43 to operate the valve 44. In this case, the sprinkler controller 18 would be pre-configured based on whether it is configured to irrigate in-front-of or behind the irrigation machine so that it irrigates only when traveling in the desirable direction.

In a similar embodiment, irrigation systems may include extension accessories that protrude from either side of a tower with some in a leading direction and others in a trailing direction. These extension accessories include a sprinkler assembly 16 and sprinkler controller 18 that is attached thereto. Displacing the sprinkler assembly 16 from the tower allows water to be dispersed on the ground that the wheels travel over, without being hindered by the tower itself. In this case, the sprinkler controller 18 is configured to sense the direction of the current motion of the irrigation machine and irrigate on the side of the irrigation machine that is opposite the direction of travel so that the wheels of the irrigation machine travel on relatively dry ground and do not create ruts or encounter other mud bogging problems.

With the known position of the sprinkler controllers on the pipe span, the rate of flow from the associated sprinkler assembly can be controlled. This is, of course, the basis of VRI. With greater accuracy of knowing the sprinkler assembly location, the sprinkler controller could vary the flow to the point where the size of the nozzle is irrelevant. That is, one size fits all or at least fewer sizes of nozzles could be installed on the pivot.

Some of the ways the flow can be varied are:
Shut the flow off with the built-in solenoid acting either as direct flow valve or as a pilot to small valve. Reference pilot valve U.S. Ser. No. 10/508,751B2.
Shut the flow off with a multifunctional pressure regulation valve (US20190317534A1).
Switch from hi to low flow using the swing through shuttle concept (U.S. Pat. No. 9,089,857B2).
Vary the flow by controlling the position of the diaphragm in the Nelson Irrigation Corporation solenoid design, which could either vary flow by changing pressure or by changing flow path size.
Vary the flow by controlling the position of the plunger in a regular or drain check.

The position of the sprinkler controllers 18 can be refined by the addition of one or more GPS units (U.S. Pat. No. 10,631,476) to establish accurate positions to provide an anchor point(s) that the sprinkler controllers 18 could reference.

The system of the described embodiments uses a unique characteristic of center pivots to eliminate the need to assign drop numbers to the sprinkler controllers in a manner that is more cost effective than existing systems.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A sprinkler controller cooperable with a sprinkler assembly that receives fluid input from a pipe span, the sprinkler controller comprising:
a microcontroller circuit;
a motion sensor coupled with the microcontroller circuit; and
a valve assembly including a modulator coupled with the microcontroller circuit and a valve coupled with the sprinkler assembly, wherein the valve meters or controls an amount of fluid output from the sprinkler assembly,
wherein the microcontroller circuit is programmed to control the valve assembly based on input from the motion sensor such that the sprinkler assembly is configured via the microcontroller circuit to measure the sprinkler assembly's motion and calculate appropriate parameters to drive the modulator and the valve assembly to operate the valve so that the amount of fluid output is a function of the measured motion relative to a corresponding measured motion of at least one of an adjacent sprinkler assembly.

2. A sprinkler controller according to claim 1, wherein the motion sensor is an accelerometer.

3. A sprinkler controller according to claim 1, wherein the motion sensor is an inertial measurement device.

4. A sprinkler controller according to claim 1, wherein the input from the motion sensor includes motion history.

5. A center pivot irrigation system comprising:
a pivot center;
a pipe span pivotally connected to the pivot center;
a plurality of sprinkler assemblies connected along the pipe span;
at least one movable pivot tower spaced from the pivot center and supporting the pipe span; and
a sprinkler controller cooperable with each of the sprinkler assemblies, each of the sprinkler controllers including:
a microcontroller circuit,
a motion sensor coupled with the microcontroller circuit, and
a valve assembly including a modulator coupled with the microcontroller circuit and a valve coupled with the sprinkler assembly, wherein the valve meters fluid output from the sprinkler assembly,
wherein the microcontroller circuit is programmed to control the valve assembly based on a calculated value derived from input from the motion sensor such that the sprinkler assembly is configured via the microcontroller circuit to measure the sprinkler assembly's motion and calculate appropriate parameters to drive the modulator and the valve assembly to operate the valve so that the amount of fluid output is a function of the measured motion relative to a corresponding measured motion of at least one other sprinkler assembly of the plurality of sprinkler assemblies.

6. A center pivot irrigation system according to claim 5, further comprising a primary controller circuit communicating with each of the sprinkler controllers, the primary controller circuit receiving motion sensor data from each of the microcontroller circuits, wherein the primary controller circuit is programmed to process the motion sensor data and assign a drop number to each microcontroller circuit based on a mathematical model.

7. A center pivot irrigation system according to claim 5, wherein the sprinkler controllers are each programmed to share the input from the motion sensor with a neighboring sprinkler controller, and wherein the sprinkler controllers are programmed to compare the shared input with its own measured motion input to determine if the neighboring sprinkler controller is closer to or farther from the pivot center.

8. A center pivot irrigation system according to claim 7, further comprising a primary controller circuit communicating with each of the sprinkler controllers, the primary controller circuit being programmed to determine a drop number for each of the sprinkler assemblies based on the shared input comparison by the sprinkler controllers.

9. A sprinkler controller set including a plurality of sprinkler controllers cooperable with a respective plurality of sprinkler assemblies that receive fluid input from a pipe span, the sprinkler controller set comprising a primary controller circuit communicating with each of the sprinkler controllers, wherein each of the sprinkler controllers in the sprinkler controller set comprises:
   a microcontroller circuit, and
   a motion sensor coupled with the microcontroller circuit, wherein the primary controller circuit is configured to receive motion sensor data from each of the microcontroller circuits, wherein the primary controller is programmed to process the motion sensor data and assign a drop number to each microcontroller circuit based on a mathematical model.

10. A sprinkler controller set according to claim 9, wherein the motion sensor comprises an accelerometer.

11. A sprinkler controller set according to claim 10, wherein the primary controller circuit is configured to compare a measured acceleration from each of the sprinkler controllers via the accelerometer such that the drop number for each of the microcontroller circuits can be assigned.

12. A sprinkler controller set according to claim 10, wherein the primary controller circuit is configured to calculate a velocity of each of the sprinkler assemblies by integrating measured acceleration values from each of the sprinkler controllers, wherein relative velocities of each of the sprinkler assemblies yields the drop number for each of the microcontroller circuits.

13. A sprinkler controller set according to claim 9, wherein each of the sprinkler controllers comprises a reed switch to enable a data reset.

14. A sprinkler controller set including a plurality of sprinkler controllers cooperable with a respective plurality of sprinkler assemblies that receive fluid input from a pipe span, each of the sprinkler controllers in the sprinkler controller set comprising:
   a microcontroller circuit, and
   a motion sensor coupled with the microcontroller circuit, wherein the sprinkler controllers are each programmed to share input from the motion sensor with a neighboring sprinkler controller, and wherein the sprinkler controllers are programmed to compare the shared input with the sprinkler controller's own measured motion input to determine if the neighboring sprinkler controller is closer to or farther from a pivot center.

15. A sprinkler controller set according to claim 14, wherein each of the sprinkler controllers further comprises a valve assembly including a modulator coupled with the microcontroller circuit and a valve coupled with the sprinkler assembly, wherein the valve meters or controls an amount of fluid output from the sprinkler assembly, and wherein the microcontroller circuit is programmed to control the valve assembly based on input from the motion sensor such that the sprinkler assembly is configured via the microcontroller circuit to measure the sprinkler assembly's motion and calculate appropriate parameters to drive the modulator and the valve assembly to operate the valve so that the amount of fluid output is a function of the measured motion.

16. A sprinkler controller set according to claim 15, wherein each of the sprinkler controllers further comprises an upstream pressure sensor and a downstream pressure sensor in fluid communication with the valve and coupled with the microcontroller circuit, the upstream pressure sensor measuring an upstream pressure value of the fluid input to the valve, and the downstream pressure sensor measuring a downstream pressure of the fluid exiting the valve, wherein the microcontroller circuit is configured to determine characteristics of fluid flow based on output from the upstream and downstream pressure sensors.

17. A sprinkler controller set according to claim 15, wherein each of the microcontroller circuits is configured to measure the microcontroller circuits' motion and calculate appropriate parameters to operate the valve so that an amount of the fluid applied is a function of the measured motion, whereby the sprinkler assemblies that are located closer to a pivot center will apply less water than the sprinkler assemblies that are located farther from the pivot center.

18. A sprinkler controller set according to claim 15, wherein the motion sensor and the microcontroller circuit are configured to determine a direction of travel, and wherein the microcontroller circuit is programmed to control the valve assembly based on the direction of travel.

19. A sprinkler controller set according to claim 18, wherein the microcontroller circuit is programmed to open the valve assembly to direct the fluid output only in a direction that is opposite to the direction of travel.

* * * * *